United States Patent
Liu et al.

(10) Patent No.: US 7,068,719 B2
(45) Date of Patent: Jun. 27, 2006

(54) SPLICING OF DIGITAL VIDEO TRANSPORT STREAMS

(75) Inventors: Vincent Liu, San Diego, CA (US); Robert S. Nemiroff, Carlsbad, CA (US); Siu-Wai Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 850 days.

(21) Appl. No.: 09/872,783

(22) Filed: Jun. 1, 2001

(65) Prior Publication Data

US 2002/0196850 A1 Dec. 26, 2002

(51) Int. Cl.
*H04N 7/12* (2006.01)

(52) U.S. Cl. ............... 375/240.12; 375/240.25; 375/240.26; 375/240.28

(58) Field of Classification Search ......... 375/240.12, 375/240.25, 240.26, 240.28; 725/32, 36; 348/14.11; 455/3.04
See application file for complete search history.

(56) References Cited

U.S. PATENT DOCUMENTS

| | | | |
|---|---|---|---|
| 5,099,319 A | | 3/1992 | Esch et al. |
| 5,600,366 A | | 2/1997 | Schulman |
| 6,029,045 A | | 2/2000 | Picco et al. |
| 6,046,971 A | | 4/2000 | Ogasawara |
| 6,137,834 A | | 10/2000 | Wine et al. |
| 6,181,383 B1* | 1/2001 | Fox et al. ............... 348/515 |
| 6,806,909 B1* | 10/2004 | Radha et al. ............. 348/384.1 |
| 2002/0080875 A1* | 6/2002 | Tahara et al. .......... 375/240.02 |

FOREIGN PATENT DOCUMENTS

| | | |
|---|---|---|
| EP | 1 009 166 | 6/2000 |
| EP | 1 079 631 | 2/2001 |
| WO | WO 97/45965 | 12/1997 |
| WO | 99/14955 | 3/1999 |
| WO | 99/52067 | 10/1999 |
| WO | WO 00/21302 | 4/2000 |

OTHER PUBLICATIONS

Björk, Niklas et al., "Transcoder Architectures for Video Coding," IEEE Transactions on Consumer Electronics, vol. 44, No. 1, Feb. 1998, pp. 88-98.

(Continued)

*Primary Examiner*—Vu Le
(74) *Attorney, Agent, or Firm*—Thomas Bethea, Jr.

(57) ABSTRACT

A mechanism for splicing advertisements, local programming and the like into a digital video transport stream is provided. In order to achieve proper splicing, an appropriate number of frames is inserted between bitstreams to properly close a GOP of the first bitstream into which a second bitstream carrying the spliced content is inserted. Program clock references (PCRs) of the bitstreams are adjusted as necessary in order to force continuity between the bitstreams. For inserting advertisements, the PCR of the program stream and ad stream can be tracked, and the PCR of the program stream can be used both before and after splicing. For local program insertion (which are typically substantially longer than advertisements), the PCR of the local program can be used, after adjustment thereof with an offset to maintain continuity at the splice point. The PTS and/or DTS of the inserted bitstream can be modified to keep them continuous at the splice point for both video and audio streams. The spliced bitstream is transcoded to maintain a desired output bit rate, and to provide overflow/underflow protection of the video buffers.

25 Claims, 1 Drawing Sheet

OTHER PUBLICATIONS

G. Keesman, et al., "Transcoding of MPEG bitstreams," Signal Processing: Image Communication, vol. 8, pp. 481-500, 1996.

M. Hurst and K. Cornog, "MPEG Splicing—Tutorial and Proposed SMPTE Standard," 139th SMPTE Technical Conference, New York City, Nov., 1997.

Revised Text for ITU-T Recommendation H.222.0, ISO/IECJTC1 1/SC 29 N 0979 Rev, Apr. 27, 1995.

Mike Perkins and Bill Helms, DIVICOM, "A Proposed Standard for Splicing," Aug. 1, 1996, pp. 1-15.

SMPTE 312M, "Proposed SMPTE Standard for Television—Splice Points for MPEG-2 Transport Streams," SMPTE Journal, Oct. 1998.

* cited by examiner

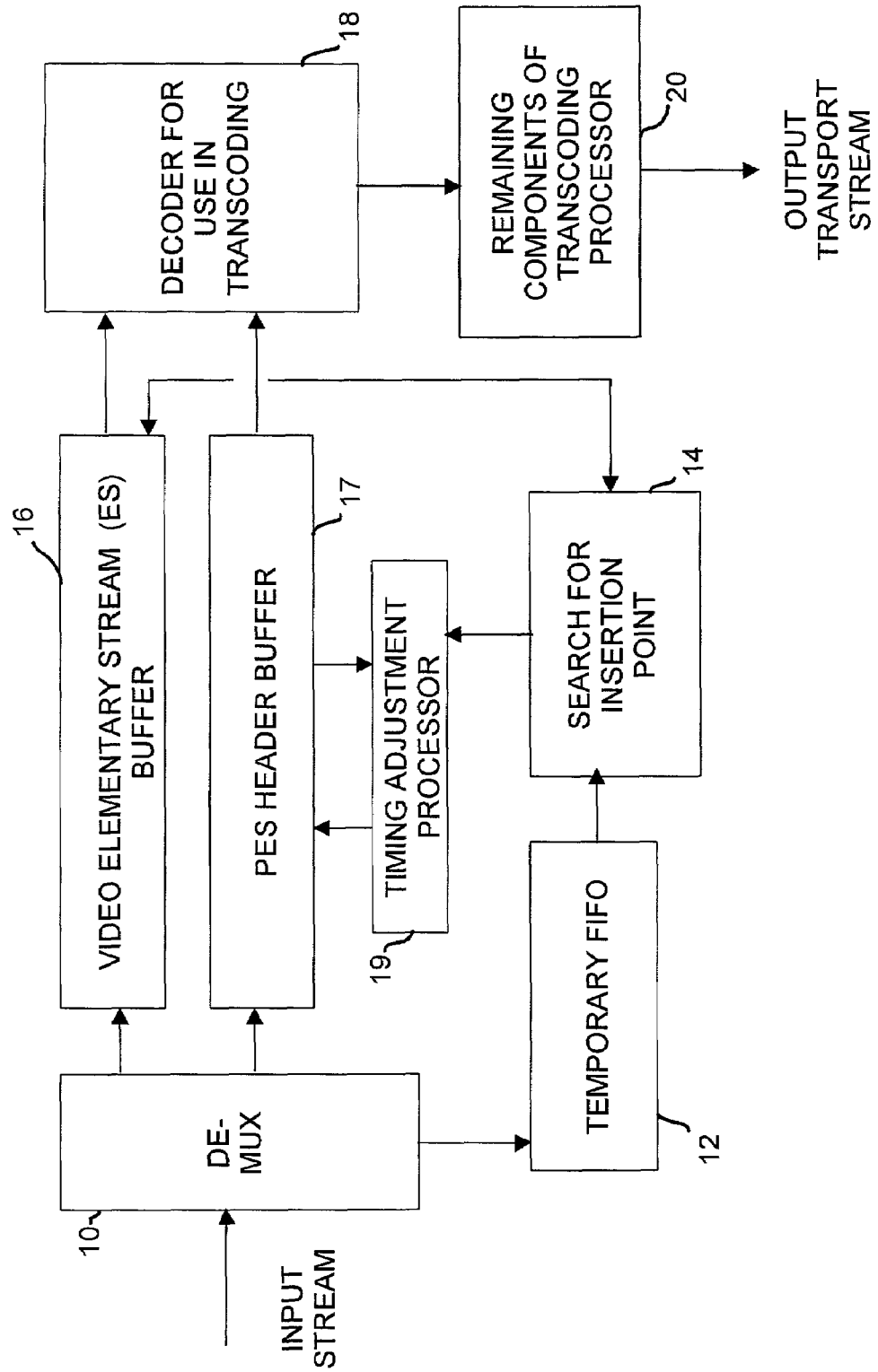

SPLICING OF DIGITAL VIDEO TRANSPORT STREAMS

BACKGROUND OF THE INVENTION

The present invention relates to the processing of digital video signals, and more particularly to the splicing of a second transport stream into a first transport stream to enable, e.g., the insertion of an advertisement, local program, or the like.

Broadcasting of digital audiovisual content has become increasingly popular in cable and satellite television networks, and is expected to gradually supplant the analog schemes used in such networks and in television broadcast networks. Various standards have been developed for the communication of digital audiovisual content, such as the MPEG-2 standard promulgated by the Motion Picture Experts Group. Moreover, MPEG-2 provides a framework, albeit incomplete, for splicing of transport streams, discussed in "Revised Text for ITU-T Recommendation H.222.0|ISO/IEC 13818-1, Information technology—Generic coding of moving pictures and associated audio information: Systems," ISO/IEC JTC 1/SC 29, Apr. 27, 1995, pp. 135–138 (Annex L—Splicing Transport Streams).

The MPEG-2 standard provides syntax elements that are relevant to splicing in a transport packet adaptation field. The syntax elements include a splicing_point_flag, which is a single bit that indicates whether a splice_countdown field is present. The splice_countdown field is used to count down how many packets of the same packet identifier (PID) occur before the splice point. Additionally, the transport stream packet in which the splice countdown field value reaches zero is called the splicing packet. The splicing point is located immediately after the last byte of the splicing packet.

However, some of the past proposals to complement the MPEG-2 capability require decoding of several of the data layers in the digital transport stream to obtain various information required to allow a successful advertisement or local content insertion. In another approach, the entire data stream, including video and audio, is decoded in a manner that maintains some of the original encoding parameters. Then, a commercial or other content is inserted into the decoded stream, and the stream is re-encoded using the conveyed parameters which were obtained during decoding. The intent was to enable more efficient re-encoding when compared to re-encoding without these parameters. However, such prior systems suffered from various problems, such as failure to close a "Group of Pictures" (GOP) of a first transport stream prior to splicing in a second transport stream, failure to maintain video buffer verifier (VBV) protection from buffer under-and over-flows, discontinuous clock references between the first and second transport streams at the splice point, and discontinuous time stamps (e.g., presentation and decode time stamps) at the splice point.

Moreover, any digital video splicing system should ensure that decoders in consumers' homes are splice-unaware (i.e., unaware of the presence of spliced data). This is to avoid having to replace these decoders and to prevent the enabling of "commercial killer" devices which detect and block out commercials.

A digital video splicing system should also be compatible with constant bit rate (CBR) and variable bit rate (e.g., including statistically multiplexed) streams. Commonly, it is necessary to adjust a bit rate of digital video programs that are provided, e.g., to subscriber terminals in a cable television network or the like. For example, a first group of signals may be received at a headend via a satellite transmission. The headend operator may desire to forward selected programs to the subscribers while adding programs (e.g., commercials or other content) from a local source, such as storage media or a local live feed. Additionally, it is often necessary to provide the programs within an overall available channel bandwidth.

Accordingly, the statistical remultiplexer (stat remux), or multi-channel transcoder, which handles pre-compressed video bit streams by re-compressing them at a specified bit rate, has been developed. A stat remux system that provides a bit rate need parameter for each channel to enable bits to be allocated for transcoding the channels in a manner that optimizes the image quality of the coded data, while still meeting the constraints of a limited throughput, is disclosed in commonly assigned U.S. patent application Ser. No. 09/669,517 filed on Sep. 25, 2000 and entitled "Statistical Remultiplexing With Bandwidth Allocation Among Different Transcoding Channels."

In order to operate efficiently within the framework established for digital video transport, it would be particularly advantageous for any system that splices advertisements or other content into a digital transport stream to be compatible with the transcoders used downstream of the insertion operation. In fact, such transcoders will generally be required in order to maintain a desired output bit rate and provide buffer protection, as taught by the present invention. Such transcoder features are disclosed, for example, in commonly assigned international patent publication no. WO 00/21302 of Apr. 13, 2000 and entitled "Method and Apparatus for Providing Rate Control in a Video Encoder", and in N. Bjork, et al., "Transcoder Architectures for Video Coding," *IEEE Transactions on Consumer Electronics*, Vol. 44, No. 1, February 1998, both incorporated herein by reference.

It would be further advantageous to provide a digital video splicing system which adds an appropriate number of frames between bitstreams, when necessary, to properly close the last GOP (or sub-GOP) of the original bitstream into which a new bitstream is being spliced. It would be still further advantageous to provide a splicing system that adjusts respective timing references (e.g., program clock references—"PCR") of the original and new bitstreams to force continuity therebetween. For example, for short insertions, such as thirty second or one minute advertisements or the like, it would be advantageous to track the PCRs of the original program stream and the insertion stream (e.g., advertisement), while using the PCR of the original program stream. For longer insertions, such as local programs that may run for thirty minutes or more, it would be advantageous to use the PCR of the local program, after adjustment with an offset accounting for the PCR of the original program stream, to maintain continuity at the splice point.

It would also be advantageous to modify the presentation time stamp (PTS) and/or decode time stamp (DTS) of the inserted stream to keep them continuous at the spice point for video and audio streams.

The present invention provides a system having the above and other advantages.

SUMMARY OF THE INVENTION

The present invention relates to a method for splicing a second compressed video transport stream into a first compressed video transport stream. An intracoded frame (I-frame) of the second transport stream is located at the beginning of a splicing operation. The I-frame, once located, is stored into a temporary storage buffer together with subsequent frames of the second transport stream. The first transport stream is searched for a suitable insertion point. A time base of at least one of the first and second transport streams is adjusted to force continuity between the transport streams at the insertion point and thereafter.

The adjusting step can, e.g., adjust a program clock reference (PCR) of the second transport stream to match a PCR of said first transport stream. For example, an offset can be added to the PCR of said second transport stream, where the offset is representative of a difference in time between the PCRs of the first and second transport streams.

In one embodiment, the adjusted PCR of the second transport stream is tracked for use in decoding information carried by the second transport stream. In another embodiment, the PCR of the first transport stream is tracked for use in decoding information carried by the second transport stream.

The first and second transport streams will typically carry successive video frames that have decode time stamps (DTS) which reference a time base of the respective transport stream. In the event that the adjusting step adjusts the time base of the second transport stream, the decode time stamps of the second transport stream frames can be correspondingly adjusted. For example, an offset can be added to the decode time stamps of said second transport stream, the offset being representative of a difference in time between (i) the DTS of a last frame of the first transport stream before said insertion point, and (ii) the DTS of the I-frame of the second transport stream which is located at the beginning of the splicing operation.

In an MPEG-2 implementation, at least some of the first and second transport stream frames will have presentation time stamps (PTS) that reference the time base of the respective transport stream. In accordance with the present invention, an offset can be added to the presentation time stamps of the second transport stream, which offset is representative of a difference in time between (i) the last PTS of the first transport stream that occurs before the insertion point, and (ii) the first PTS of the second transport stream that occurs at or after the insertion point. It is noted that MPEG-2 specifications do not require PTS or DTS every frame. When the PTS/DTS is not present, the PTS/DTS for the frame can be computed in accordance with the invention based on the last received PTS/DTS and the types of frames (i.e., repeat_fields and I/B/P frames) transmitted since the last received PTS/DTS. Advanced Television System Committee (ATSC) specifications do require a PTS every frame and a DTS on frames where the DTS does not equal the PTS.

In a preferred embodiment, the insertion point will follow a Group of Pictures (GOP) or a sub-GOP in the first transport stream. Unless the insertion point coincides exactly with the end of the GOP or sub-GOP, the most recent anchor frame of the first transport stream at the end of the GOP or sub-GOP will be repeated until the insertion point occurs. This procedure effectively closes the GOP of the first bitstream before splicing in the second bitstream.

It should be appreciated that each video frame, including the anchor frame mentioned above, will typically include a plurality of display fields (e.g., a top field and a bottom field). Due to detelecine processing at the upstream encoder, the ending field polarity of the first bitstream does not always complement the beginning field polarity of the second bitstream. In the preferred embodiment of the invention, the number of display fields in the repeated anchor frame is adjusted, so that the last field displayed by the anchor frame prior to the insertion point will complement the polarity of the first display field of the initial I-frame of the inserted second transport stream. In other words, if the I-frame of the second transport stream has the top field displayed first, then the preceding anchor frame of the first transport stream (into which the second stream is inserted) will be adjusted to end with its bottom field displayed, and vice-versa.

The spliced transport stream is provided to a transcoder which maintains a desired output bit rate for the spliced stream. The transcoder further provides protection from an underflow or overflow of a video buffer verifier.

The invention also provides corresponding apparatus.

BRIEF DESCRIPTION OF THE DRAWING

The FIGURE is a block diagram showing the splicing operation in accordance with the present invention.

DETAILED DESCRIPTION OF THE INVENTION

The present invention relates to digital video processing, and more particularly to methods and apparatus for splicing commercials, local programming, and the like into a digital video transport stream for delivery to viewers of television and/or multimedia programs.

To implement splicing in accordance with the invention, a transcoding processor ("TPE") similar to the transcoder implementation described in G. Keesman, et al., "Transcoding of MPEG bitstreams", *Signal Processing: Image Communication,* 8 (1996), pages 481–500, is modified to change the operation of the front-end demultiplexing. The FIGURE shows the TPE front-end as modified by the invention to add the splicing functions. An input stream is provided to a conventional de-multiplexer/parser 10. The additional components added by the present invention consist of a temporary FIFO 12 for holding the beginning of a second video transport stream (identified by a packet identifier (PID) as defined, e.g., in the MPEG-2 standard), an insertion point search module 14 and a timing adjustment processor 19. The "beginning" of the second video transport stream, as defined herein, is identified by an intra-coded frame (I-frame), which is located by the de-multiplexer/parser 10 in a conventional manner. The intent of the invention is for the TPE to splice the second transport stream (which carries, for example, a commercial or a local program segment) into a first transport stream (which typically carries a television program, movie, or the like). The temporary FIFO 12 is fed by the de-multiplexer/parser in a generally conventional manner such as that in which in which the other front-end elementary stream (ES) buffers (such as video ES buffer 16 and program ES header buffer 17) are fed, except that at the beginning of a splicing operation, the parser will search for an I-frame in the second video transport stream before filling up FIFO 12. The nature of the first Group of Pictures (GOP) on the second transport stream is preferably communicated to the TPE. If no such information is provided, the TPE will make the following assumptions in accordance with the invention:

(a) for a bitstream coming from an advertisement server, the first GOP is assumed to be a closed GOP of the type IBBP, where the first two B-frames are predicted only from the I-frame, or a closed GOP of type IPBB, where there are no B-frames immediately following the I-frame. The exact choice is made by examining the picture header following the I-frame;

(b) for all other bitstreams, the GOP is assumed to be an open GOP, IBBP. In the open GOP case, the I-frame decoder time stamp (DTS) is reset to be equal to its presentation time stamp less one frame time (i.e., DTS=PTS–one frame time). Any subsequent B-frames immediately following the I-frame are dropped without entering into the FIFO.

At the output of the FIFO 12, a module 14 is provided for searching for a suitable insertion point in the first transport stream. This process can be implemented, for example, by searching the video elementary stream buffer 16 for a suitable insertion point. Buffer 16 holds the actual video stream (either the first stream or the spliced-in second stream) that is ultimately transcoded and output to a distribution network (such as a cable or satellite television network, the Internet, or the like) for receipt, processing, and viewing by consumers. In the preferred embodiment, the search for an insertion point is conducted only when the temporary FIFO 12 contains video data (i.e., second transport stream data for splicing into an existing first transport stream).

A timing adjustment processor 19 is provided to adjust the timing in the program elementary stream (PES) header buffer 17, as described in greater detail below. As well known in the art, the PES header includes data such as presentation time stamp (PTS), decode time stamp (DTS) and program clock reference (PCR) data. Both buffers 16 and 17 receive their respective data from the demultiplexer/parser 10, and provide output to a transcoder 18, 20 for further processing. The processor 19 is advised of the insertion point, once determined, by the insertion point search module 14.

It is noted that it is important to keep track of the time bases of both the first and second transport bitstreams in terms of their offsets to the master hardware clock. One reason for this is that cue messages are typically provided by television programmers to identify when commercials are to be inserted, and the splice point PTS embedded in the cue messages might be referenced to either one of the two time bases. The splice time provided on the cue messages is assumed to be in the PTS domain. For simplicity of discussion, all time stamps are translated into the hardware reference time base. Such cue messages are typically carried on a separate PID stream, as well known in the art and set forth in standards such as the SMPTE 312M, "Splice Points for MPEG-2 Transport Streams"; Society of Cable and Telecommunications Engineers (SCTE) Digital Video Subcommittee DVS-380, "Digital Program Insertion Splicing API"; and DVS-253, "Digital Program Insertion Cueing Message for Cable."

If the PTS given by the splice point cue message is correct, it will be one frame time after the PTS of an anchor frame (i.e., an I or P frame) in the first bitstream. Otherwise, frame repeats are needed to patch up any time gap between the PTS of the cue message and the PTS of the anchor frame that is prior to it. The use of repeat frames is described in more detail below.

In order to find the proper insertion point for splicing the second transport stream into the first transport stream, the following rules are applied:

(A) When the second transport stream (i.e., "second PID") is an advertisement bitstream on a server, the front-end de-multiplexer 10 will search this stream and capture the first I-frame it sees. This I-frame is treated as the beginning of the advertisement. A PTS is established for the beginning of this bitstream. If the starting PTS of the advertisement bitstream is before the splice point PTS of the cue message, an offset is added to the PTS of the advertisement so that the advertisement PTS will match the cue message PTS. All subsequent PTS's from the advertisement transport stream will be delayed by the same amount. If the advertisement does not have a PTS, the PTS from the cue message will be used.

(B) If the second transport stream is a continuous running program, it will be assumed that all GOP's are open GOP's (i.e., that the B-frames immediately following an I-frame are bi-directionally predicted from the previous GOP as well as from the current GOP). As a result, these B-frames are not usable in the splicing operation and will be discarded. For each GOP in the second transport stream, the PTS of the I-frame is compared with the PTS of the splice point. If the I-frame PTS is equal to or later than the splice point, that I-frame will be the beginning of the second bitstream. A PTS for the beginning of this stream is simply the I-frame PTS. As discussed before any B-frames immediately following the I are discarded without storing in the temporary FIFO of FIG. 1.

Both rules A and B above ensure that the starting PTS of the second bitstream will be equal to or later than the splice point PTS. However, the PTS of the second stream is not necessarily frame-aligned with the splice point PTS. In other words, the second bitstream PTS is not always an integer number of fields away from the splice point PTS. To force alignment, the present invention adds an offset to the second bitstream PTS so that the integer condition is met.

Whenever the PTS is delayed, the corresponding DTS for the same frame is delayed by the same amount. In accordance with the preferred embodiment of the invention, the PTS and DTS are always delayed, and never advanced in time. This assures that the decoding of the second bitstream by the transcoder will occur later rather than earlier, and therefore decoder buffer underflows are avoided. On the other hand, temporary buffer overflows might occur at the splice point since the two bitstreams were encoded separately and their buffer models do not necessarily match at the splice point. This can be resolved by increasing the size of the main video elementary stream buffer 16 illustrated in the FIGURE.

In order to find the proper insertion point along the first bitstream, the search process (module 14) will examine the PTS's of the frames already in the main elementary stream (ES) buffer. Once it finds a frame whose PTS exceeds the PTS of the splice point less one frame time (i.e., splice point PTS—one frame time), that frame and the sub-GOP it belongs to will be discarded or simply over-written when the main ES buffer is a buffer implemented using random access memory (RAM). The insertion point is defined to be ahead of the discarded sub-GOP. In fact, all frames in the first bitstream subsequent to the discarded sub-GOP will be over-written by the second bitstream since they are no longer required.

To determine the number of repeat frames needed between the two bitstreams, the de-multiplexer 10 needs the following information:

(i) the PTS of the anchor frame before the splice point; and (ii) the PTS of the beginning of the second bitstream, as found in accordance with rules A and B above. The distance between the two is at least two fields apart. The de-multiplexer 10 will also need to know the top_field_first bits belonging to the anchor frame and to the first presentation frame of the second bitstream. With this information, the de-multiplexer performs the following steps:

I) If the two top_field_first bits match and the distance between the PTS's is an even number of fields, then the number of repeat frames inserted is simply the distance between the PTS's less one frame time. The repeat_first_ field flag of the anchor frame from the first bitstream is set to zero in the preferred embodiment, although those skilled in the art will appreciate that the flag can be set to another value depending on the specific implementation used.

II) If the two top_field_first bits do not match and the distance between the PTS's is an odd number of fields, then the number of repeat frames needed is the PTS distance less three field times. The repeat_first_field flag of the anchor frame from the first bitstream is set to one in the preferred embodiment, although those skilled in the art will appreciate that the flag can be set to another value depending on the specific implementation used.

III) If the two top_field_first bits match and yet the distance between the PTS's is an odd number of fields, then an extra field time is added to the PTS of the beginning of the second bitstream and the PTS is treated in the same manner as in step I above.

IV) If the two top field first bits do not match, and the distance between the PTS's is an even number of fields, then an extra field time is added to the PTS of the beginning of the second bitstream, and the PTS is treated in the same manner as in step II above.

It should be noted that by changing the repeat first_field_ flag of an anchor frame, the number of display fields that anchor has is changed. In the specific embodiment described herein, which is not intended to be limiting, if the repeat_first_field flag is one, the number of display fields equals three; otherwise the number of display fields equals two. This new number will be used in the following description of creating repeat frames and calculating the PTS and DTS values.

The actual insertion of repeat frames is as follows:

a) The PTS of the last anchor frame belonging to the first bitstream is first stored in a register. If that register is less than the PTS of the second bitstream less the number of display fields of the anchor, the de-multiplexer will generate a repeat frame. The repeat frame will have a PTS given by the register value plus the number of display fields of the anchor. The DTS of the repeat frame will be set to be equal to the PTS of the anchor frame. The repeat frame will always be a P-frame, and it will always have two display fields, just as in a normal non-film mode video frame. The register is then set to the new PTS value of the repeat frame.

b) If the register is still less than the second bitstream PTS less two field times, then another repeat frame is generated with a PTS equal to the register value plus two fields; and a DTS equal to the PTS of the previous repeat frame. The register is then incremented by two fields. The process of creating repeat frames continues until the above "if" condition is no longer true.

At this point, the first I-frame in the second bitstream is inserted into the elementary stream buffer. The DTS of the first I-frame is set to the PTS of the last anchor frame or the last repeat frame (if repeat frames were used) of the first bitstream. The I-frame PTS is set to the PTS of the last anchor frame or last repeat frame plus the number of display fields contained within the last anchor or repeat frame plus any display fields belonging to B-frames immediately following the I-frame.

After the I-frame has been inserted, all subsequent frames will come from the second bitstream, and their PTS/DTS values will be extrapolated from the time stamps of the first I-frame. This extrapolation follows the same algorithm used in the DigiCipher II+ (DCII+) encoder available from the Broadband Communications Sector of Motorola, Inc., Horsham, Pa., U.S.A., formerly General Instrument Corporation, the assignee of the present invention. In particular, for a B-frame, the B-frame DTS is set to the DTS of the previous frame plus the number of display fields of the previous frame. The PTS of a B-frame is always equal to its own DTS. For an anchor (i.e., an I or P frame), its DTS is set to the PTS of the previous anchor frame and its PTS is set to the PTS of the previous anchor frame plus the number of display fields in the previous anchor frame plus the number of display fields belonging to B-frames immediately following the current anchor frame.

The system of the present invention also includes a transcoder at the output of the main video elementary stream buffer 16 and program elementary stream (PES) header buffer 17. The transcoder illustrated in the FIGURE is broken down into two sections; namely, a decoder 18 for use during the transcoding process, and the remaining components 20 of the transcoding processor, which are well known in the art. The output transport stream is provided from the transcoder section 20, as illustrated in the FIGURE. As in regular transcoding modes, at the input to the transcoder, both the first and the second bitstreams will have the first packet of each frame tagged with 1) the stream's most recently received PCR time stamp; 2) the offset between the PCR time stamp and the transcoder's own hardware master clock counter (e.g., 27 MHz—this offset will be known as the PCRoffset), and 3) the arrival time of that most recent PCR stamp. The arrival time will be referred to as the PCRHwInTag.

The two input bitstreams have their own periodic PCR time stamps representing two independent clocks having their frequencies close to but not exactly matching 27 MHz. At the splice insertion point, the transcoder will switch to the new PCR time base of the second bitstream while one needs to maintain the continuity of the PCR value. This is achieved by applying an adjustment factor to the PCR value of the second bitstream. When the splice insertion point is found in the main ES buffer, the adjustment factor is calculated for the PCR offset before frames from the second program can be written into the main ES buffer. The adjustment factor is given by:

$$\text{Adjustment} = \text{slope} * (\text{PCRHwInTag}_3 - \text{PCRHwInTag}_2) + \text{PCRoffset}_2 - \text{PCRoffset}_3$$

$$\text{where slope} = (\text{PCRoffset}_1 - \text{PCRoffset}_2)/(\text{PCRHwInTag}_1 - \text{PCRHwInTag}_2)$$

$\text{PCRoffset}_3$ and $\text{PCRHwInTag}_3$ refers to the PCR offset and associated hardware tag on the first frame of the second transport stream ("second bitstream").

$\text{PCRoffset}_2$ and $\text{PCRHwInTag}_2$ refers to the PCR offset and associated hardware tag on the last frame of the first transport stream ("first bitstream").

$\text{PCRoffset}_1$ and $\text{PCRHwInTag}_1$ refers to the PCR offset and associated hardware tag on the second to the last frame on the first bitstream.

The adjustment described above will be applied to all PCR's on the second bitstream after the splicing is effected. It is added to the PCRoffsets from the second bitstream.

The transcoder also handles rate control. As discussed above in connection with finding the starting point on the second transport stream for splicing, by delaying the PTS/DTS of the second bitstream, any problem with video elementary stream buffer underflow is automatically solved. Overflow of this buffer (e.g., due to the splicing of two diverse bitstreams) can be avoided by providing a large elementary stream buffer.

With the transcoder able to decode the combined ("spliced") bitstream correctly, the rate control from that point on will be the same as a regular (i.e. non-spliced) bitstream. The transcoder will use the same rate control algorithm as in its regular transcoding mode.

It should now be appreciated that the present invention provides a mechanism for splicing advertisements, local programming and the like into a digital video transport stream. Various novel technical features are provided, including the addition of an appropriate number of frames between bitstreams to properly close a GOP of the first bitstream into which a second bitstream carrying the advertisement, local programming or the like is inserted. Program clock references (PCRs) of the bitstreams are adjusted as necessary in order to force continuity between the bitstreams. For example, for inserting advertisements, the PCR of the program stream and ad stream can be tracked, and the PCR of the program stream can be used both before and after splicing. For local program insertion (where such local programs are typically substantially longer than advertisements), the PCR of the local program can be used, after adjustment thereof with an offset to maintain continuity at the splice point. Moreover, the PTS and/or DTS of the inserted bitstream can be modified to keep the PTS/DTS continuous at the splice point for both video and audio streams. Finally, the spliced bitstream is transcoded to maintain a desired output bit rate, and provide video buffer verifier buffer protection.

Although the invention has been described in connection with various preferred embodiments, it should be appreciated that various modifications and adaptations may be made thereto without departing from the scope of the invention as set forth in the claims.

What is claimed is:

1. A method for splicing a second compressed video transport stream into a first compressed video transport stream, comprising:
   locating an intracoded frame (I-frame) of the second transport stream at the beginning of a splicing operation;
   storing the I-frame once located together with subsequent frames of the second transport stream into a temporary storage buffer;
   searching said first transport stream for a suitable insertion point therein; and
   adjusting a time base of at least one of the first and second transport streams to force continuity between the transport streams at said insertion point and thereafter, wherein;
      said insertion point follows a Group of Pictures (GOP) or a sub-GOP in said first transport stream; and
      a most recent anchor frame of the first transport stream at the end of said GOP or sub-GOP is repeated until the insertion point occurs.

2. A method in accordance with claim 1, wherein: said adjusting step adjusts a program clock reference (PCR) of said second transport stream to match a PCR of said first transport stream.

3. A method in accordance with claim 2, wherein the adjusted PCR of said second transport stream is tracked for use in decoding information carried by the second transport stream.

4. A method in accordance with claim 2, wherein the PCR of said first transport stream is tracked for use in decoding information carried by the second transport stream.

5. A method in accordance with claim 2, wherein said adjusting step adds an offset to the PCR of said second transport stream, said offset being representative of a difference in time between the PCRs of the first and second transport streams.

6. A method in accordance with claim 1, wherein:
   successive video frames are provided in said first and second transport streams;
   said frames have decode time stamps (DTS) which reference a time base of the respective transport stream; and
   in the event that said adjusting step adjusts the time base of the second transport stream, the decode time stamps of the second transport stream frames are correspondingly adjusted.

7. A method in accordance with claim 6, wherein video from said first and second streams is frame synchronized, and:
   said adjusting step adjusts a program clock reference (PCR) of said second transport stream to match a PCR of said first transport stream; and
   the decode time stamps of the second transport stream frames are adjusted in accordance with the adjustment of the second transport stream PCR.

8. A method in accordance with claim 7, wherein the adjusted PCR of said second transport stream is tracked for use in decoding frames of the second transport stream.

9. A method in accordance with claim 7, wherein the PCR of said first transport stream is tracked for use in decoding frames of the second transport stream.

10. A method in accordance with claim 6, wherein an offset is added to the decode time stamps of said second transport stream, said offset being representative of a difference in time between (i) the DTS of a last frame of the first transport stream before said insertion point, and (ii) the DTS of said I-frame of the second transport stream.

11. A method in accordance with claim 10, wherein:
   at least some of the first and second transport stream frames have presentation time stamps (PTS) which reference the time base of the respective transport stream; and
   an offset is added to the presentation time stamps of the second transport stream, said offset being representative of a difference in time between (i) the last PTS of the first transport stream that occurs before said insertion point, and (ii) the first PTS of the second transport stream that occurs at or after said insertion point.

12. A method in accordance with claim 1, wherein:
   successive video frames are provided in said first and second transport streams;
   at least some of said frames have presentation time stamps (PTS) which reference a time base of the respective transport stream; and
   an offset is added to the presentation time stamps of the second transport stream, said offset being representative of a difference in time between (i) the last PTS of the first transport stream that occurs before said insertion point, and (ii) the first PTS of the second transport stream that occurs at or after said insertion point.

13. A method in accordance with claim 12, wherein:
   said adjusting step adjusts a program clock reference (PCR) of said second transport stream to match a PCR of said first transport stream; and
   the presentation time stamps of the second transport stream frames are adjusted in accordance with the adjustment of the second transport stream PCR.

14. A method in accordance with claim 13, wherein the adjusted PCR of said second transport stream is tracked for use in decoding frames of the second transport stream.

15. A method in accordance with claim 13, wherein the PCR of said first transport stream is tracked for use in decoding frames of the second transport stream.

16. A method in accordance with claim 1, wherein:
said anchor frame includes a plurality of display fields; and
the number of said display fields is adjusted, so that the last field displayed by the anchor frame prior to said splice complements a polarity of a first display field of said I-frame of said second transport stream.

17. A method in accordance with claim 1, further comprising:
providing the spliced transport stream to a transcoder which maintains a desired output bit rate for the spliced stream.

18. A method in accordance with claim 17, wherein said transcoder further provides protection from an underflow or overflow of a video buffer verifier.

19. Apparatus for splicing a second compressed video transport stream into a first compressed video transport stream, comprising:
a de-multiplexer adapted to locate an intracoded frame (I-frame) of the second transport stream at the beginning of a splicing operation;
memory adapted to store the I-frame once located together with subsequent frames of the second transport stream; and means for searching said first transport stream for a suitable insertion point therein;
wherein a time base of at least one of the first and second transport streams is adjusted to force continuity between the transport streams at said insertion point and thereafter, and
said insertion point follows a Group of Pictures (GOP) or a sub-GOP in said first transport stream; and means are provided for repeating a most recent anchor frame of the first transport stream at the end of said GOP or sub-GOP until the insertion point occurs.

20. Apparatus in accordance with claim 19, further comprising: means for adjusting a program clock reference (PCR) of said second transport stream to match a PCR of said first transport stream in order to force said continuity.

21. Apparatus in accordance with claim 20, further comprising: means for adjusting, in accordance with the adjustment of the second transport stream PCR, decode time stamps of video frames carried by the second transport stream.

22. Apparatus in accordance with claim 19, wherein:
successive video frames are provided in said first and second transport streams;
at least some of said frames have presentation time stamps (PTS) which reference a time base of the respective transport stream; and
means are provided for adding an offset to the presentation time stamps of the second transport stream, said offset being representative of a difference in time between (i) the last PTS of the first transport stream that occurs before said insertion point, and (ii) the first PTS of the second transport stream that occurs at or after said insertion point.

23. Apparatus in accordance with claim 19, wherein: said anchor frame includes a plurality of display fields; and means are provided for adjusting the number of said display fields, so that the last field displayed by the anchor frame prior to said splice complements a polarity of a first display field of said I-frame of said second transport stream.

24. Apparatus in accordance with claim 19, further comprising: a transcoder for receiving the transport streams and maintaining a desired output bit rate after splicing.

25. Apparatus in accordance with claim 24, wherein said transcoder further provides protection from an underflow or overflow of a video buffer verifier.

* * * * *